United States Patent
Yamazaki et al.

(10) Patent No.: US 7,263,612 B2
(45) Date of Patent: Aug. 28, 2007

(54) COMMUNICATION SYSTEM AND MANAGEMENT APPARATUS AND METHOD FOR RESTRICTING FUNCTIONS IN COMMUNICATION SYSTEM

(75) Inventors: Shinichi Yamazaki, Kanagawa (JP); Toshihiko Myojo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 10/640,607

(22) Filed: Aug. 13, 2003

(65) Prior Publication Data

US 2004/0044904 A1 Mar. 4, 2004

(30) Foreign Application Priority Data

Aug. 28, 2002 (JP) .............................. 2002-247899
Jul. 2, 2003 (JP) .............................. 2003-189924

(51) Int. Cl.
*H04L 9/00* (2006.01)
(52) U.S. Cl. .................. 713/168; 713/153; 713/169; 713/182; 726/3; 726/4; 726/5; 726/6; 709/225; 709/227; 709/228; 709/229
(58) Field of Classification Search ................ 726/3–6; 713/153, 168, 169, 182; 709/225, 227, 228, 709/229
See application file for complete search history.

(56) References Cited

U.S. PATENT DOCUMENTS

| | | | | |
|---|---|---|---|---|
| 6,049,878 A | * | 4/2000 | Caronni et al. | 726/3 |
| 6,564,261 B1 | * | 5/2003 | Gudjonsson et al. | 709/227 |
| 6,851,053 B1 | * | 2/2005 | Liles et al. | 713/168 |
| 7,043,760 B2 | * | 5/2006 | Holtzman et al. | 726/28 |
| 7,047,560 B2 | * | 5/2006 | Fishman et al. | 726/6 |
| 7,076,797 B2 | * | 7/2006 | Loveland | 726/4 |
| 2001/0023487 A1 | * | 9/2001 | Kawamoto | 713/202 |
| 2003/0097449 A1 | * | 5/2003 | Derocher et al. | 709/227 |

* cited by examiner

*Primary Examiner*—Kim Vu
*Assistant Examiner*—Beemnet W Dada
(74) *Attorney, Agent, or Firm*—Cowan, Liebowitz & Latman, P.C.

(57) ABSTRACT

In order to prevent illegal data tampering or leakage of information caused by devices connected to a system such as a conference system and save time and trouble in setting functional restrictions separately from an application, an access point uses authentication information for authenticating electronic devices operated by participants who participate in a conference also as the information to decide functional restrictions on the electronic devices during the conference.

4 Claims, 8 Drawing Sheets

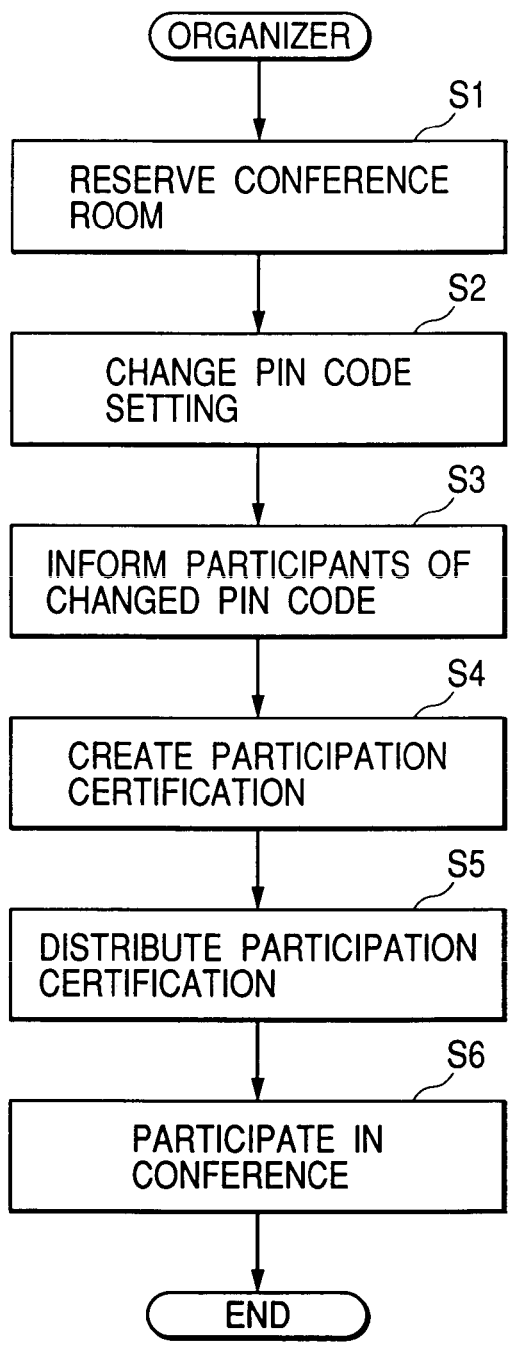
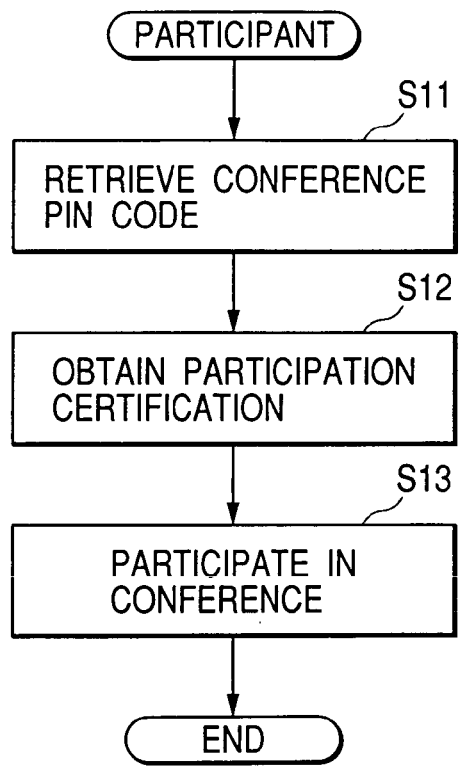
FIG. 3
FIG. 4

FIG. 8

| FUNCTION | ORGANIZER | PARTICIPANT |
|---|---|---|
| BROWSE FILE | ○ | ○ |
| COPY FILE | ○ | × |
| DELETE FILE | ○ | × |
| PRINT FILE | ○ | × |
| CHANGE FILE NAME | ○ | × |
| OVERWRITE FILE | ○ | × |
| SAVE FILE | ○ | × |
|  |  |  |
|  |  |  |
| BROWSE NET | ○ | △ |
| CHANGE IP ADDRESS | ○ | × |
| CHANGE PIN CODE | ○ | × |
| SEND AND RECEIVE MAIL | ○ | × |
|  |  |  |
|  |  |  |

COMMUNICATION SYSTEM AND MANAGEMENT APPARATUS AND METHOD FOR RESTRICTING FUNCTIONS IN COMMUNICATION SYSTEM

BACKGROUND OF THE INVENTION

1. Field of the Invention

The present invention relates to a communication system, management apparatus and method for restricting functions in a communication system and, for example, to the assignment of functional restrictions to electronic devices used by participants of a conference using a conference system.

2. Related Background Art

A conventional conference has a disadvantage that materials to be released are distributed to all participants on a paper basis, which leads to waste of resources. Furthermore, it also involves a disadvantage that when the number of materials is not enough for all participants, the necessary materials need to be copied in haste, which may interrupt the progress of the conference.

On the other hand, it is becoming a general practice in recent years that participants bring a PC (personal computer), PDA (Personal Digital Assistants) into a conference room and materials to be released are projected by a projector and presented. Moreover, the above disadvantages are covered by distributing document data to participants other than the presenter through a network, not on a paper basis.

However, in the case of a conference with many participants if all participants use a network, this leads to another disadvantage that wiring becomes complicated. To handle this additional disadvantage, a conference system using a wireless communication such as Bluetooth is now under consideration.

Since the Bluetooth system performs ad-hoc multi-point connections, it can construct a pico-net with a maximum of 8 devices connected and a communication range of 10 m and communicate and provide an asynchronous communication with downlink 721 Kbps and uplink 57.6 Kbps. It also supports speech communications, has the ability to transfer speech and data through a single channel, etc., and in this way it is expected to be used for applications in a variety of platforms.

The conference system using the wireless communication such as Bluetooth described above may eliminate complicated wiring, but it involves another disadvantage in an aspect of security due to illegal access and data tampering, etc., from the outside through wireless connections.

Moreover, another disadvantage is that once a user is authenticated, the Bluetooth authentication level cannot prevent the user from copying a document, printing it or overwriting data.

In order to overcome the above-described disadvantage, there is a proposal about a method for improving utility and security levels by using two types of PIN codes; private PIN codes and temporary PIN codes for different devices depending on their modes of use (e.g., see Document 1 (U.S. Patent Publication No. 2001036273). There is also another proposal about a method of specifying authorization in a conference for each terminal and restricting their functions (e.g., see Document 2 (EP A2 1249097)).

Furthermore, a standard or work intended to enhance security using a Port Based Network Access Control technology is underway to cope with the problems with illegal access, data tampering or access control (e.g., see Document 3 (IEEE802.1x (Institute of Electrical and Electronic Engineers 802.1x)).

The invention described in Document 2 selects, when giving authorization to devices of participants, a tab for specifying the authorization with which each participant participates in the conference from an application on a conference system and sets the authorization according to the selected tab.

However, the problem with such a system is that it not only takes time and trouble for participants but also allows the participants to change the setting of the authorization arbitrarily or manipulate data by changing the authorization deliberately.

On the other hand, the invention described in Document 3 installs a RADIUS (Remote Authentication Dial-In User Service) server as a terminal authentication server and adopts a method for performing authentication using an electronic certificate or password, etc., with the authentication server before each terminal accesses a conference system.

However, such a configuration allows only conference participants who have terminals supporting an IEEE802.1x compatible program to participate in the conference and the problem is that participants having terminals manufactured before IEEE802.1x was considered or participants having a device such as a PDA (Personal Digital Assistance) which is often provided with Bluetooth but not supporting IEEE802.1x cannot participate in the conference.

SUMMARY OF THE INVENTION

It is an object of the present invention to prevent illegal data tampering or leakage of information using devices connected to a system such as a conference system.

It is another object of the present invention to save time and trouble in performing functional restrictions on an application separately.

Other objects of the present invention will become more apparent from the following specification and drawings.

BRIEF DESCRIPTION OF THE DRAWINGS

FIG. 3 is a flow chart showing operations in this embodiment until an organizer of a conference participates in the conference;

FIG. 4 is a flow chart showing operations in this embodiment until participants of the conference participate in the conference;

FIG. 8 illustrates a table of functions restricted by the conference system in the above embodiment.

DETAILED DESCRIPTION OF THE PREFERRED EMBODIMENTS

First Embodiment

Figure 1:
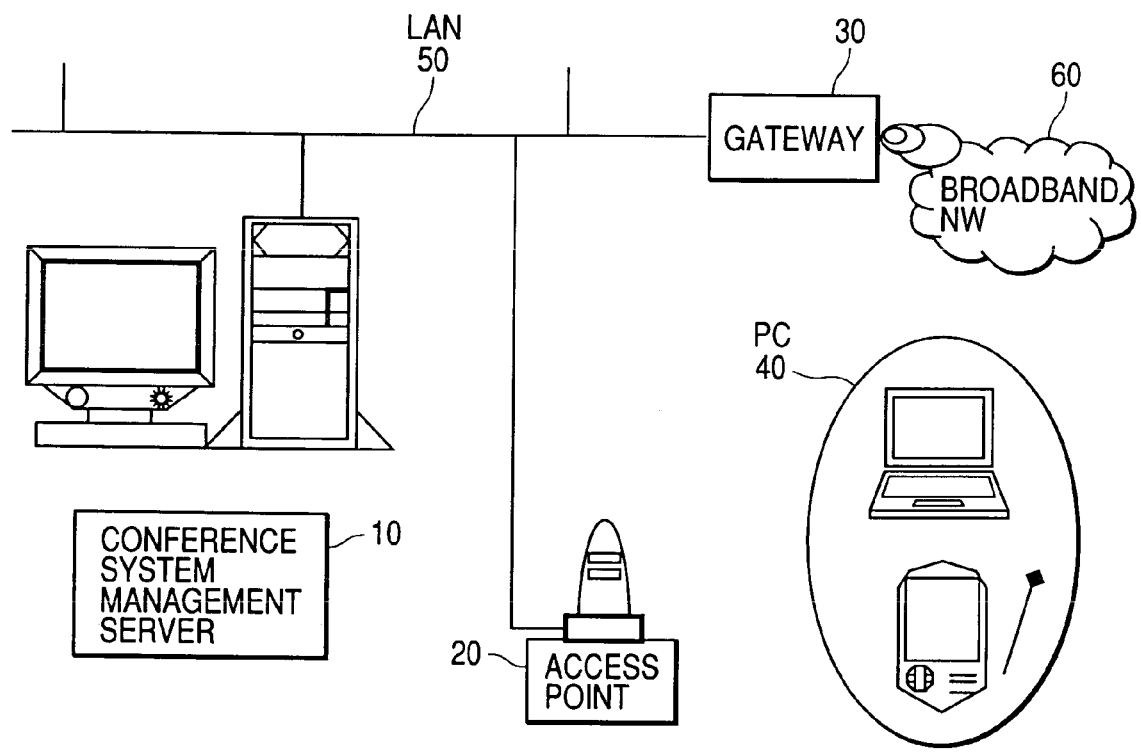
FIG. 1 is a block diagram of a wireless communication system WC1 which is a first embodiment of the present invention.

FIG. 1 is a block diagram of a wireless communication system WC1 which is a first embodiment of the present invention.

The wireless communication system WC1 includes a conference system management server 10, an access point 20, a gateway 30, a PC 40, a LAN 50 and a broadband network 60.

The conference system management server 10 is necessary to access the broadband network 60 and is a server to operate an application of the conference system.

The PC 40 is an example of a wireless terminal brought by a conference organizer or participant and allows wireless connection using Bluetooth.

The access point 20 is a point necessary to make a connection from the PC 40 as a wireless terminal to the LAN 50 as the backbone. Furthermore, the access point 20 is connected to the backbone LAN 50 and acts as a general switching hub. When the PC 40 brought in by the conference organizer or participant is connected to the conference server 10 using a cable, it is possible to connect a plurality of PCs to the conference system management server 10 using the hub. When a wireless connection is made, each device is connected to the access point 20 and data is exchanged with the conference system management server 10 through the access point 20.

When a connection is made to the access point 20, it is necessary to perform user authentication with the security taken into account. Generally, user authentication is performed by exchanging a PIN CODE (Personal Identification Number) between devices. However, if a default PIN code of the access point 20 is fixed, a person who made a connection once can make connections many times using the same PIN code, which poses a problem from the standpoint of security.

Therefore, this embodiment adopts a method whereby the organizer of the conference makes a connection to the access point 20 beforehand using a default PIN code and changes it to a PIN code available for a conference only. In this case, if the default PIN code is fixed as described above, it is possible for anybody to change the setting and even change the default PIN code deliberately. Then, there may be a case where an authorized organizer decides to change the default PIN code to a PIN code which is available for the conference only and tries to make a connection using the default PIN code but the organizer cannot make any connection.

Thus, the following means is adopted. That is, when a conference room is reserved by a conference room reserve system, etc., run by the conference system management server 10, a default PIN code is set in the access point 20 which belongs to the conference room and at the same time this is notified to the organizer by mail, etc. The organizer makes a connection to the access point 20 using the PIN code notified from the conference system management server 10 and changes it to a PIN code available for the conference only. Participants enter the conference room carrying a participation certification including a PIN code available only for the conference notified from the organizer beforehand.

Figure 2:
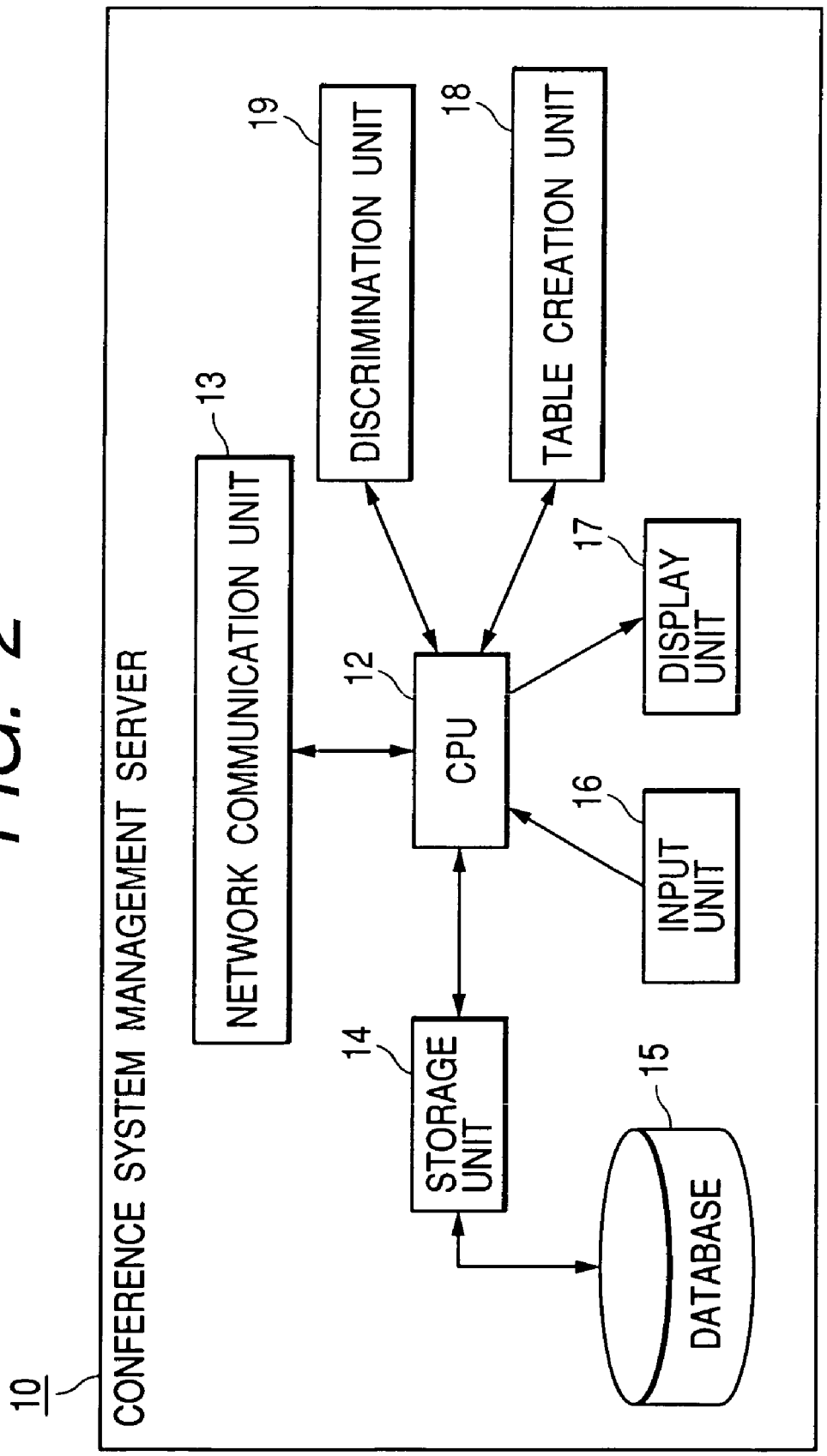
FIG. 2 is a block diagram showing a conference system management server 10 in this embodiment.

FIG. 2 is a block diagram showing the conference system management server 10 in this embodiment.

The conference system management server 10 includes a main control unit (CPU) 12, a network communication unit 13, a storage unit 14, a database 15, an input unit 16, a display unit 17, a table creation unit 18 and a discrimination unit 19.

The main control unit 12 controls the conference system, manages various applications and controls the input unit and display unit.

The network communication unit 13 transmits/receives data to/from the PC 40 as one of various wireless terminals connected to a wired communication network or wireless communication network according to instructions of the main control unit 12. The storage unit 14 manages various table data and files created by the table creation unit 18.

The input unit 16 controls the input using a keyboard, mouse, etc., and the display unit 17 controls the display such as a CRT monitor. The table creation unit 18 creates various tables such as an IP address table and functional restriction table. The discrimination unit 19 discriminates whether the sender of a participation certification is the organizer or a participant of the conference based on the participation certification acquired by the network communication unit 13.

FIG. 3 is a flow chart showing operations until the organizer of the conference participates in a conference in this embodiment.

First, the conference organizer reserves (S1) the conference room using the conference room reserve system, etc., makes a connection to the access point 20 using a default PIN code set in the access point 20 and changes the setting to a PIN code available for the conference only (S2). Then, the organizer notifies the PIN code available for the conference only to the participants of the conference by e-mail, etc. (S3).

Then, a participation certification file for the organizer containing mail addresses, PIN codes and employee IDs, etc., and a participation certification file for conference participants other than the organizer are created (S4) and these files created are distributed to all the participants by email, etc., (S5) to participate in the conference (S6). The participation certification for the organizer describes only two codes; the default PIN code and the PIN code available for the conference only, while the participation certification of the conference participants other than the organizer describes the PIN code available for the conference only and the participation certification file for the conference participants other than the organizer is distributed to the participants other than the organizer.

FIG. 4 is a flow chart of this embodiment showing operations until a conference participant participates in the conference.

First, the participant acquires a PIN code available for the conference only distributed by the organizer (S11). The method for acquiring this PIN code is not limited to e-mail but can also be adapted so that the participant accesses the Web, etc., created by the organizer and acquires a PIN codes available for the conference only distributed by the organizer.

Then, the participant receives the participation certification distributed by the organizer (S12), brings the participation certification and participates in the conference (S13). Since this participation certification describes a PIN code, it is also possible to omit the process of acquiring a PIN code available for the conference only (S11).

Figure 5:
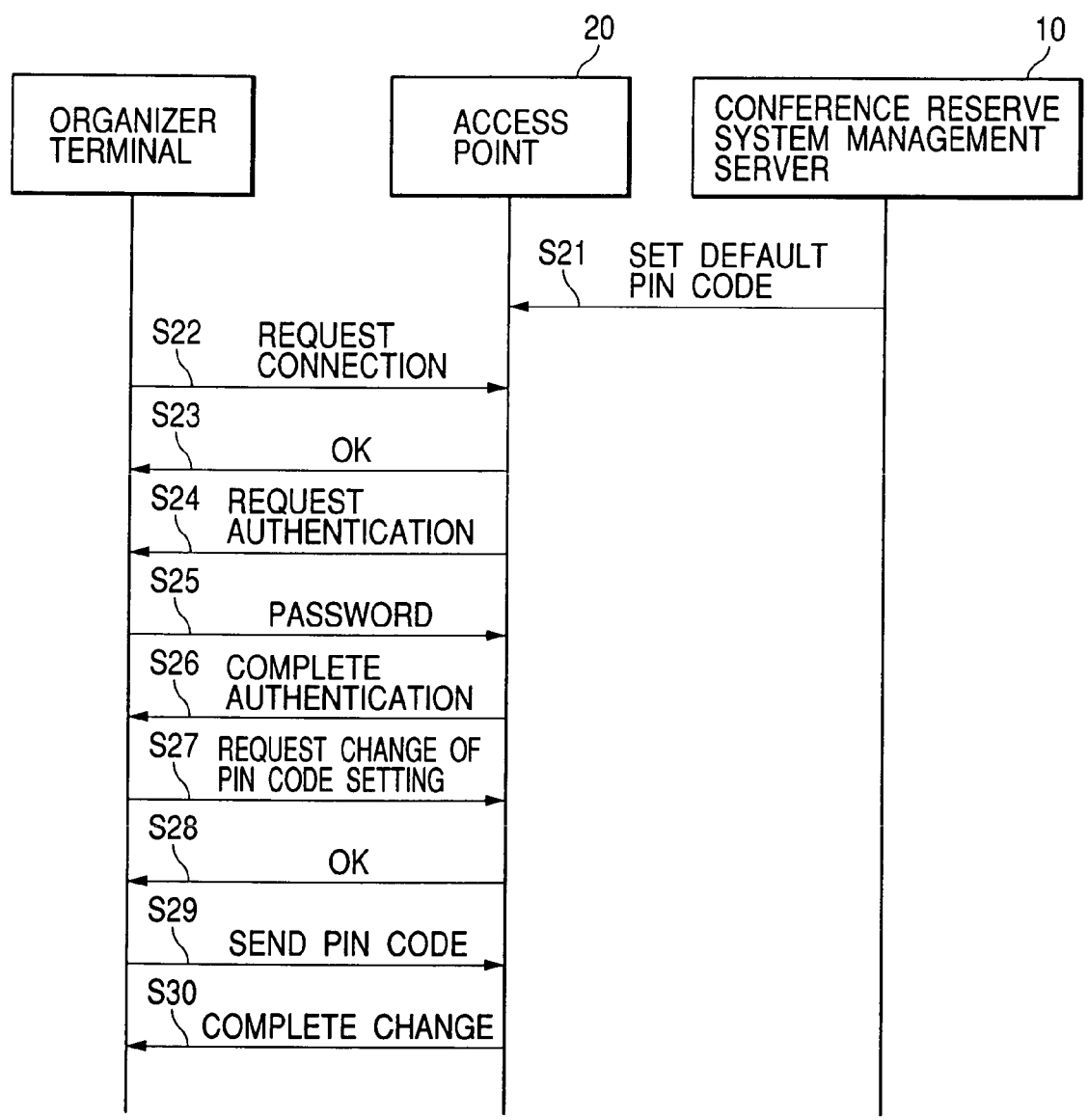
FIG. 5 is a sequence diagram showing processing of the organizer changing a PIN code of an access point 20 in this embodiment.

FIG. 5 is a sequence diagram of this embodiment showing the processing for the organizer to change the PIN code of the access point 20.

First, when the organizer reserves a conference room using the conference room reserve system, the conference system management server 10 makes a connection to the access point 20 through the LAN 50 and sets a default PIN code in the access point 20 (S21). This conference system management server 10 has the functions of operating the conference room res erve system, automatically creating a PIN code when a conference room is reserved by the conference room reserve system, setting this PIN code in the access point 20 as the default PIN code and notifying this default PIN code to the person who made the reservation.

Upon receipt of the notification of the default PIN code from the conference system management server 10, the organizer sets this default PIN code and the PIN code available for the conference only in the PC 40 as the wireless device.

Then, the organizer issues a connection request from the PC 40 as the own wireless device to the access point 20 (S22). The access point 20 receives the connection request and if the data is correct, it sends a message for establishment of a connection to the PC 40 of the organizer and the connection is established (S23).

Then, the access point 20 issues an authentication request to the PC 40 of the organizer and urges the organizer to request a password (S24). When the PC 40 on the organizer side receives the authentication request, the PC 40 sends the preset default PIN code to the access point 20 (S25). When the PIN code sent from the PC 40 of the organizer is correct, the access point 20 notifies the PC 40 of the organizer of the completion of the authentication (S26).

Then, the PC 40 of the organizer issues a request for changing the setting of the PIN code to the access point 20 (S27) and when a response about the receipt of the request message is returned from the access point 20 that has received it (S28), the PC 40 sends a preset PIN code available for the conference only (S29). Upon receipt of a new PIN code, the access point 20 changes the setting to the PIN code and sends a message of completion of the change to the PC 40 as the wireless device of the organizer and the connection processing is completed (S30).

In the above-described explanations, the default PIN code sent from the PC 40 of the organizer to the access point 20 and the PIN code available for the conference only are automatically sent. However, it is also possible for the organizer to input the PIN code using an input unit (not shown) in response to every request from the access point 20 and send the input PIN code.

Figure 6:
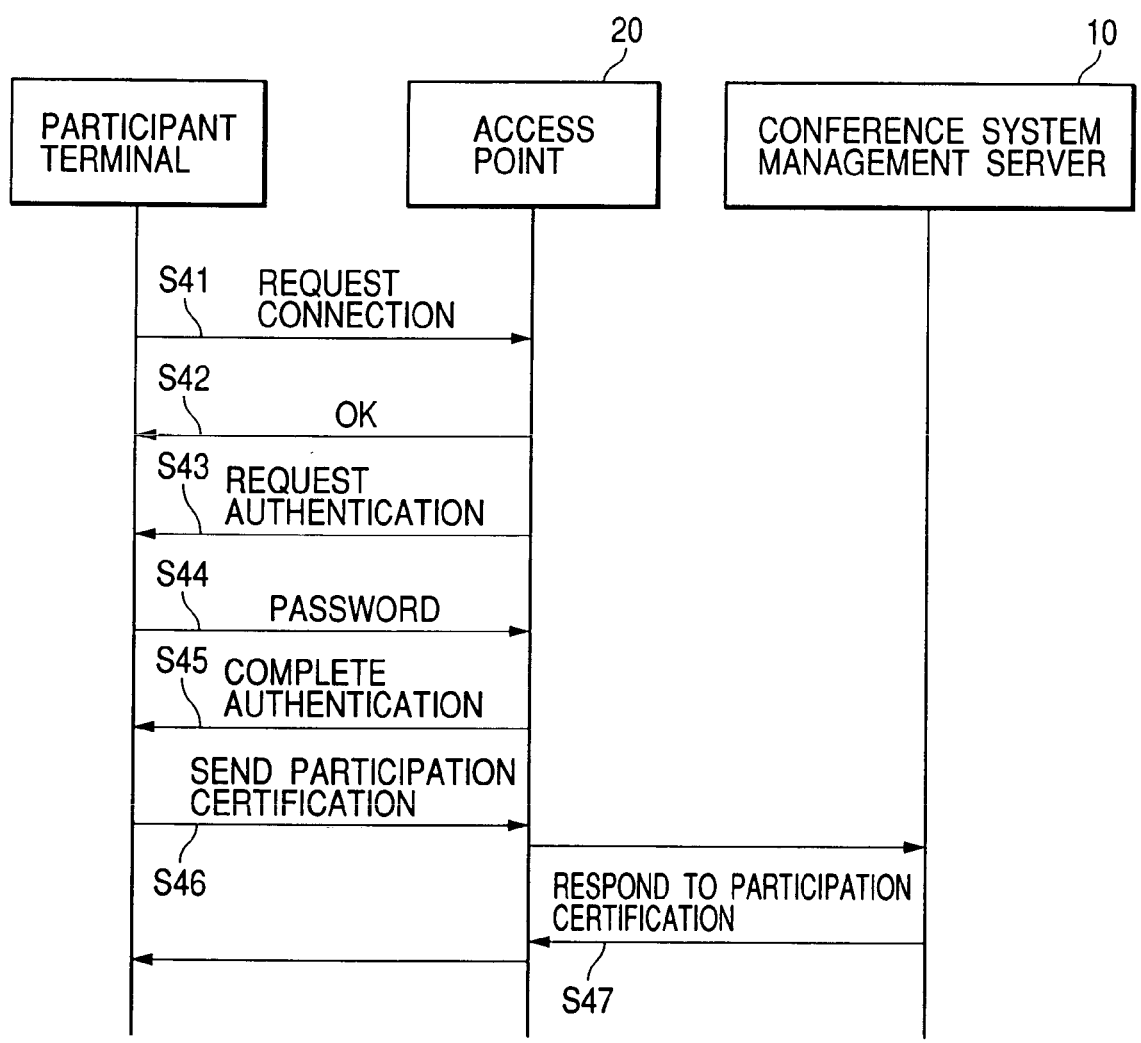
FIG. 6 is a sequence diagram showing processing when participants participate in a conference in this embodiment.

FIG. 6 is a sequence diagram of this embodiment showing the processing when a participant participates in a conference.

After the setting of the PIN code explained in FIG. 5 is changed, the same processing as that shown in FIG. 6 is also carried out when the organizer disconnects the wireless connection with the access point 20 once and makes a reconnection to the access point 20.

The participant presets the PIN code available for the conference only notified from the organizer in the PC 40. When the participant arrives at the conference room, the participant issues a connection request from the own PC 40 to the access point 20 (S41). The access point 20 receives the connection request and if the data is correct, it sends a message of establishment of a connection to PC 40 of the participant and the connection is established (S42).

Then, the access point 20 issues an authentication request to the PC 40 of the participant and urges the participant to request a password (S43). Upon receipt of the authentication request, the PC 40 of the participant sends a preset PIN code available for the conference only (S44). If the PIN code sent from the PC 40 of the participant is correct, the access point 20 sends a message of completion of authentication. Therefore, upon receipt of the message of completion of authentication from the access point 20 (S45), the PC 40 of the participant sends a pre-distributed participation certification to the conference system management server 10 through the access point 20 (S46). Upon receipt of the participation certification, the conference system management server 10 performs such an operation that will be described in FIG. 7, sends a response about the reception to the PC 40 of the participant and the connection processing is completed (S47).

Figure 7:
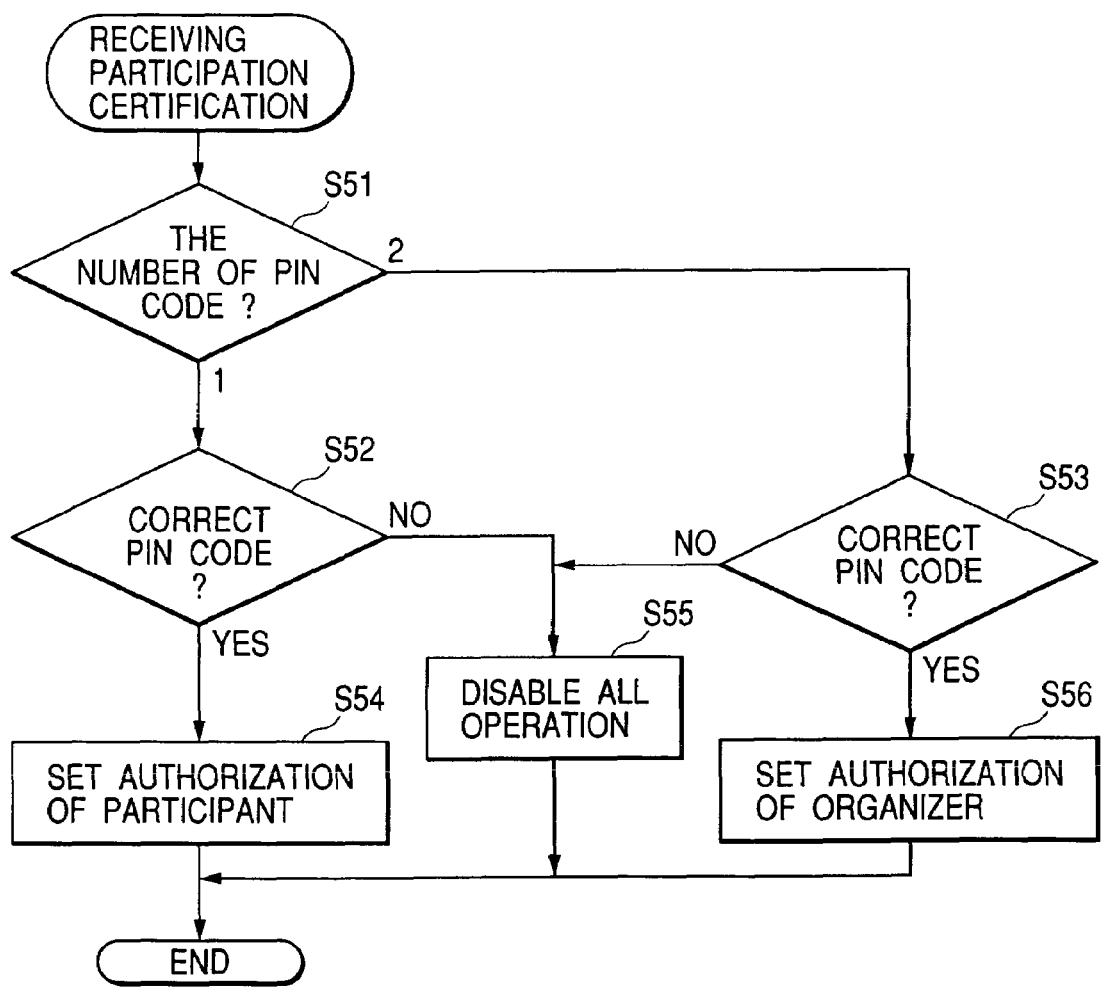
FIG. 7 is a flow chart showing an operation of a discrimination unit 19 of a conference system management server when a participation certification is received from the organizer or participants in this embodiment.

FIG. 7 is a flow chart of this embodiment showing an operation of the discrimination unit 19 of the conference system management server upon receipt of a participation certification sent from the organizer or the participant.

It is assumed that the participation certification includes at least a PIN code.

Upon receipt of the participation certification sent in step S46 in FIG. 6, the conference system management server 10 checks the PIN code described in the participation certification. If there are two types of PIN code described in the participation certification (default PIN code and the PIN code available for the conference only) (S51) and they match the PIN codes stored in the conference system management server 10 (S53), the conference system management server 10 regards the party on the other end of the connection as the organizer and gives the function and authorization of an organizer to the PC 40 that sent the participation certification (S56).

On the other hand, if there is only one type of PIN code (the PIN code available for the conference only) (S51), and it matches the PIN code stored in the conference system management server 10 (S52), the conference system management server 10 regards the party on the other end of the connection as a participant other than the organizer and gives the function and authorization of a participant other than the organizer to the PC 40 that sent the participation certification (S54). If the conference system management server 10 receives a participation certification including an illegal PIN code, it regards the access as illegal access and disables all manipulations by the PC 40 (S55).

The explanation above has described the procedure for transferring the participation certification in which the PIN code is described after a connection is completed, but since the participant terminal without any default PIN code makes a connection using a PIN code available for the conference only, it is also possible to adopt a configuration omitting any transfer of the participation certification after receipt of the authentication completion message. In this case, the conference system management server 10 decides the party on the other end of the connection only when this participation certification is received. When the other party owns these two types of PIN code correctly, the conference system management server 10 performs access control giving the function and authorization of an organizer; otherwise it performs access control giving the function and authorization of a participant, and can thereby realize the same functions as those described above and further omit the procedure for transferring the participation certification.

FIG. 8 illustrates a table of functions restricted by the conference system in the above embodiment.

If the function and authorization of an organizer are given in step S56 of FIG. 7, it is possible to use the functions marked with circles in the field of the organizer in FIG. 8 and if the authorization of a participant other than the organizer is given in step 54, it is possible to use the functions marked with circles in the field of the participant and not possible to use the functions marked with "x". "<" indicates that the function is available with certain restrictions.

Here, "Browse File", "Copy File", "Delete File", "Print File", "Change File Name" and "Overwrite File" respectively mean browsing, copying, deleting, printing, changing the name of and overwriting a file which is disclosed to other devices through the LAN 50 shown in FIG. 1.

"Save File" means saving the file to a device such as a server (e.g., conference system management server 10) connected through the LAN 50 shown in FIG. 1.

"Browse File" is the function to access the broadband network 60 (Internet and intranet) through the gateway 30 shown in FIG. 1.

"Change IP address" is the function to access the access point 20 and change the IP address assigned to the conference system management server 10 when the authorization during the conference is given from the conference system management server 10. "Change PIN code" is the function to change the PIN code (PIN code available for the conference only) set in the access point 20. "Send and Receive Mail" is the function to send/receive mail to/from the broadband network 60 through the gateway 30.

Second Embodiment

When each participant is assigned an externally accessible IP address and allowed to access the broadband network 60 without restrictions, the participant may leak important information to outsiders deliberately using a Web mail service, etc.

Thus, the second embodiment of the present invention is an embodiment which improves the method whereby the conference system management server 10 in the first embodiment assigns an IP address to the PC 40.

That is, the second embodiment is an embodiment in which the conference system management server 10 places restrictions on access to the broadband network 60 using a PIN code described in the participation certification received in step S46 in FIG. 6.

More specifically, in step S51 of FIG. 7, when there are two types of PIN code (default PIN code and PIN code available for a conference only) and the default PIN code stored in the conference system matches the PIN code available for the conference only (S53), the conference system management server 10 decides that the user of the PC 40 who sent the participation certification is the organizer, sets the authorization of the PC 40 during the conference as the organizer and assigns an IP address capable of accessing the broadband network 60 to the PC 40 (S56).

When there is only one type of PIN code (the PIN code available for the conference only) and it is the correct PIN code (S51, S52), the user of the PC 40 who sent the participation certification is decided to be a participant other than the organizer. Then, the authorization of the PC 40 during the conference is set as the participant other than the organizer and an IP address which does not allow the PC 40 to access the broadband network 60 is assigned thereto. When the IP address of the conference system management server 10 is acquired, an IP address table of the gateway 30 connected to the LAN 50 is acquired and shared to acquire the IP address of the conference system management server 10.

More specifically, when the PC 40 as the wireless terminal is connected to the conference system management server 10, the conference system management server 10 acquires the IP address table of the gateway 30. At the same time, the conference system management server 10 decides whether the user is the organizer or a participant based on the PIN code described in the participation certification acquired and distributes the IP address to a wireless terminal authorized to access the broadband network 60.

This time, the IP address table of the gateway 30 is acquired simultaneously with the connection of the wireless terminal, but it is also possible to acquire the table at predetermined time intervals.

Furthermore, the gateway 30 and the conference system management server 10 share the IP address table by adding the IP address to the IP address table and sending it to the gateway 30.

The second embodiment sets access restrictions on access to the broadband network 60 depending on whether the user is the organizer or a participant, and can thereby prevent illegal access from outside.

Third Embodiment

The conference system management server 10 decides access authorization to be given to participants based on a PIN code input from the PC 40 as each wireless terminal and assigns an IP address to each wireless terminal. However, in this case, even a participant who owns a wireless terminal compliant with an authentication procedure by a higher-level protocol such as IEEE802.1x needs to perform authentication at a wireless link level without using the higher-level authentication procedure. For this reason, it is not possible to effectively use resources of the device. Furthermore, when the higher-level authentication function is provided for the conference system management server 10, the participant needs authentication by a PIN code in addition to the higher-level authentication procedure, which forces complicated operations.

The third embodiment of the present invention is an embodiment concerning access control which provides the conference system management server 10 with an authentication function with a higher-level protocol such as IEEE802.1x and carries out authentication processing available to each PC 40 when there is a mixture of conference participants using wireless terminals compliant with the authentication procedure and conference participants using wireless terminals not compliant with the authentication procedure.

More specifically, the third embodiment provides the conference system management server 10 with a higher-level authentication function (IEEE802.1x in this embodiment) and provides the access point 20 with a link-level authentication function that requests PIN codes and allows it to make a link-level connection with a wireless terminal without requesting PIN code input. Then, after a link is established, the access point 20 is provided with a function of executing the higher-level authentication procedure, decides access authorization based on each authentication result and assigns an IP address to the PC 40 as each wireless terminal.

Figure 9:
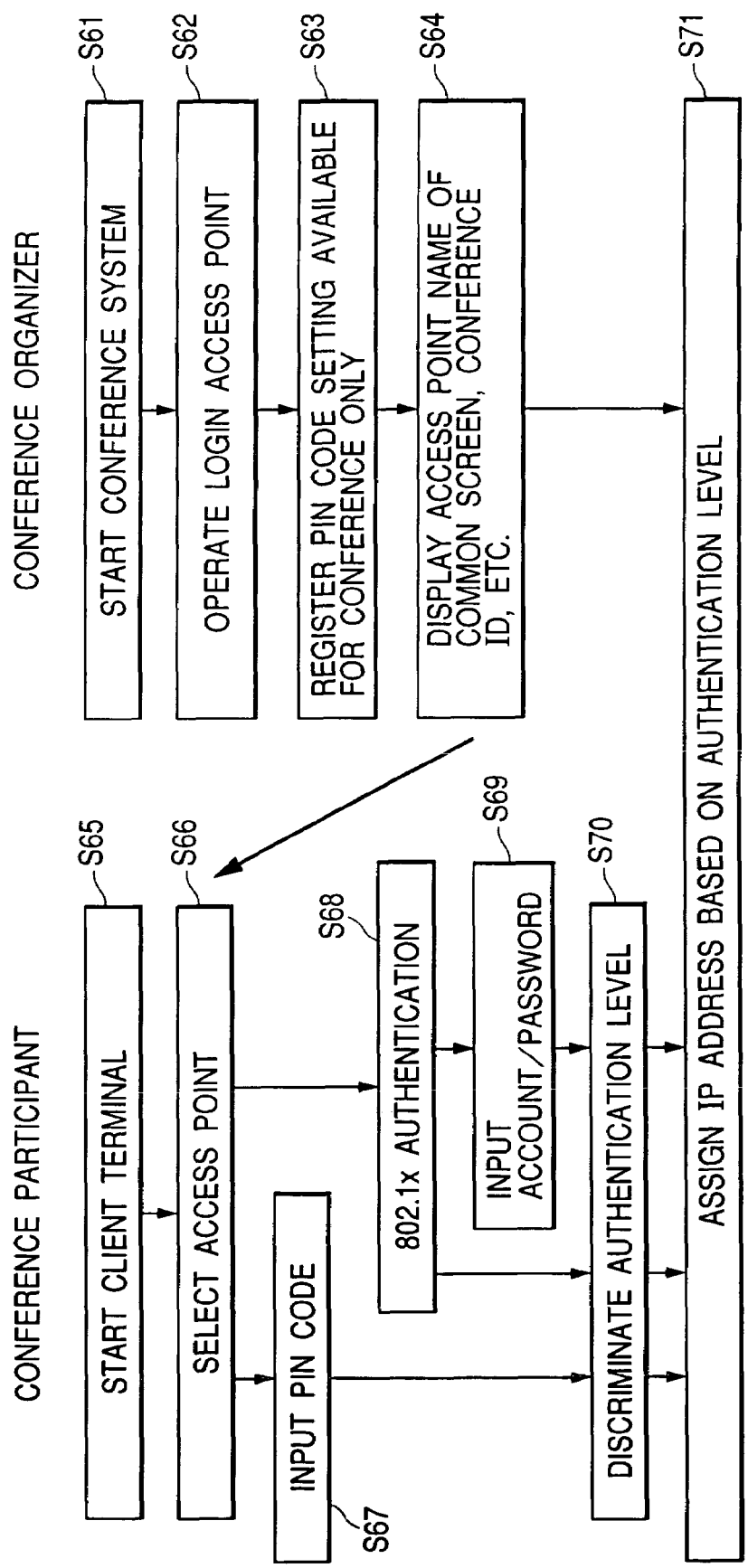
FIG. 9 is a flow chart showing manipulation of each wireless terminal according to a third embodiment of the present invention and operations of a conference system management server 10 according to the manipulation.

FIG. 9 is a flow chart illustrating operations of each wireless terminal according to the third embodiment of the present invention and operations of the conference system management server 10 according to those operations.

First, the organizer starts a conference system run by the conference system management server 10 (S61) and makes a link to the access point 20. When link-level authentication is performed using the PIN code set as default through this login operation as in the case of the above described first and second embodiments, the conference system management server 10 decides that the login terminal is the PC 40 of the organizer and assigns an IP address giving access right based on the authorization of an organizer to the PC 40 of the organizer (S62).

When the IP address is assigned and the login operation is completed, the organizer then issues a request for changing the PIN code setting to set a PIN code available for the conference only and when a reception response to the request is received from the access point 20, the organizer sends the PIN code which is available for the conference only. The access point 20 which has received this new PIN code changes the setting of the received PIN code and sends a change completion message to the PC 40 of the organizer (S63).

When the change of the PIN code setting is completed, the PC 40 of the organizer creates a participation certification including the PIN code to be used for link-level authentication requesting a PIN code, an account and a password used by the PC 40 bearing no electronic certification for a higher-level authentication procedure which is carried out after a link is established between the access point 20 and the PC 40 as the wireless terminal, and distributes the participation certification to participants.

The organizer accesses the conference system management server 10 by operating the device, notifies it of information necessary to participate in the conference such as the name of the access point 20 used for this conference and a meeting ID and requests it to display the information on the screen of a shared display (not shown) used in the conference (S64). Upon receipt of the request, the conference system management server 10 displays the above information notified from the organizer on the screen of the shared display used in the conference and completes preparations for the conference.

On the other hand, conference participants other than the organizer start client terminals in the place where the conference is held (S65), select a desired access point 20 from the names of the access points 20 already displayed on the screen and issue a connection request signal to the access point 20.

Here, the access point 20 selected by the participants varies depending on the function of the wireless terminals brought by the participants. For example, when the wireless terminal has the higher-level authentication procedure processing (this embodiment describes the case where IEEE802.1x is mounted as the higher-level authentication procedure and will be referred to as "802.1x supplicant" hereinafter) function such as IEEE802.1x, an access point 20 with the setting that does not require PIN code input when a link is established is selected. On the other hand, when the wireless terminal is not provided with the 802.1x supplicant function, an access point 20 which performs link-level authentication when a link is established is selected (S66).

Here, if a participant terminal without the 802.1x supplicant function sends a connection request to the access point 20 at which link-level authentication is set, a PIN code request for carrying out ink-level authentication is received from the access point 20.

Then, the participant terminal sends the PIN code notified by the participation certification and when the link-level authentication is established (S67), the conference system management server 10 checks the authentication route of the participant terminal and if the connection is decided to be the one using the PIN code set for this participant (S70), the conference system management server 10 assigns an IP address to be given to a conference participant subject to access restrictions to the participant terminal (S71)

Furthermore, when a terminal having an 802.1x supplicant function issues a link connection request to the access point 20 set for higher-level authentication, a wireless link is established between the participant terminal and access point 20.

Then, when the link is established, the participant terminal outputs an authentication request to the higher-level authentication procedure processing (here described as "802.1x Authenticator" for the above reason) function, the access point 20 requests an ID necessary for authentication in response to this and then performs an authentication operation with the authentication server function of the conference system management server 10 according to the IEEE802.1x procedure (S68).

If the participant terminal has an electronic certificate at this time, it is authenticated by the authentication server function of the conference system management server 10 and if it has no electronic certificate, a request for the account name and a password is issued from the authentication server function of the conference system management server 10.

The participant terminal that has received the request continues the authentication procedure using the account name and password included in the participation certification and receives the authentication for participation in the conference (S69). Furthermore, when these account and password are input, if the participant has an account and password to make a connection to another network (e.g., intranet and Internet), it is also possible to enter these authorized account and password and receive authentication. The authentication procedure from the ID request onward carried out here is the procedure described in IEEE802.1x, and therefore this Specification will omit explanations of the procedure.

Then, when higher-level authentication is established, the conference system management server 10 decides the authentication route of the participant terminal and if the connection is decided to be the one authenticated by 802.1x (S70), the conference system management server 10 checks the authentication account and if the participant owns an authorized account, the conference system management server 10 assigns an IP address also authorizing access to other networks in addition to the authorization of a conference participant and if the participant is a participant authenticated with the previously distributed account, it gives the IP address to be given to a conference participant subject to access restrictions to the participant terminal (S71).

Here, if a terminal having no 802.1x supplicant function makes a connection to the access point 20 set for higher-level authentication, a wireless link connection is established without PIN code input. However, after the link is established, the authentication request procedure is not carried out by the participant terminal and it is therefore no longer possible to execute further access.

On the other hand, when the participant terminal having the 802.1x supplicant function makes a link to the access point 20 set for link-level authentication, the participant terminal receives a PIN code request from the access point 20 when the link is established. Then, when link-level authentication is established with the PIN code notified with the participation certification, then the 802.1x supplicant function issues a higher-level authentication request from the participant terminal.

The access point 20 that has received this signal ignores the authentication request because only link-level authentication is valid as the authentication procedure. Then, the conference system management server 10 decides that the connection is the one with the PIN code set for a participant and gives an IP address to be given to a conference participant subject to access restrictions to the participant terminal.

The above explanation has described an example of the case where when the participant terminal having the 802.1x supplicant function is connected to the access point 20 set for link-level authentication, 802.1x authentication is not performed. However, without being limited to this, the present invention can also be adapted so that even in the case of link-level authentication, when the participant terminal issues a request for higher-level authentication, the higher-level authentication procedure is carried out and an IP address is assigned according to the authentication account.

Furthermore, an example of the case where the access point 20 is changed according to the level of the protocol to be authenticated has been explained. However, the present invention is not limited to this configuration and, for example, it is possible to realize the same operation described above by providing the access point 20 with a plurality of communication channels (configuration allowing an independent pico-net to be formed).

Furthermore, this embodiment provides the conference system management server 10 with the higher-level authentication function. However, the present invention is not limited to this, and for example, it is also possible to provide the access point 20 with the higher-level authentication function and provide the means capable of acquiring authentication information from the conference system management server 10 and thereby carry out the same operation described above.

The third embodiment provides the means for performing authentication of terminals which participate in a conference at a plurality of protocol levels, and can thereby eliminate restrictions on terminals brought by conference participants. Furthermore, it prevents devices which can receive higher-level authentication from changing the setting of the authentication function only for the conference, allows the participants to omit PIN code input which is necessary for link-level authentication while maintaining the security level and participate in the conference without complicated operations and settings.

The above described embodiment uses PIN codes described in conference participation certifications distributed beforehand by e-mail, etc., discriminates a participant from an organizer of a conference, sets restrictions on data access, and can thereby prevent illegal data tampering and save time and trouble in setting restrictions separately from an application.

Furthermore, for a terminal supporting an authentication procedure by a higher-level protocol and having a higher-level authentication function, the present invention omits PIN code input, and can thereby allow participants to participate in the conference through the same operations as those of non-supported terminals while securing the security.

The above described embodiments can also be adapted so as to use a PDA instead of the PC 40.

As described above, the present invention can prevent illegal data tampering or leakage of information by devices connected to a network of a conference system, etc., and at the same time has the effect of saving time ant trouble in setting functional restrictions separately from an application.

What is claimed is:

1. A management apparatus in a communication system having an access point to connect electronic devices operated by participants who participate in a conference, comprising:

discriminating means for discriminating whether or not said participants are an organizer of the conference, based on authentication information used by said electronic devices to carry out an authentication procedure, and discriminating the organizer of the conference from participants other than said organizer; and restricting means for setting functional restrictions on the electronic devices operated by said participants according to the discrimination by said discriminating means, wherein said management apparatus has an operation restriction table for setting restrictions on operations of said organizer and said participants and wherein items restricted by said operation restriction table are items including items of restrictions on connections to other networks.

2. The management apparatus according to claim 1, wherein said electronic devices are connected to said access point by means of Bluetooth, and said discriminating means discriminates statuses of said participants based on the PIN code used for authentication between said electronic devices and access point.

3. The management apparatus according to claim 1, wherein the management apparatus comprises an IP address table creation unit which assigns IP addresses to said electronic devices and at the same time creates an IP address table.

4. A communication system provided with a management apparatus which manages electronic devices operated by participants who participate in a conference, comprising:

discriminating means for discriminating whether or not said participants are an organizer of the conference, based on authentication information used by said electronic devices to carry out an authentication procedure, and discriminating the organizer of the conference from participants other than said organizer; and restricting means for assigning functional restrictions in said communication system to the electronic devices that have completed said authentication procedure based on the discrimination by said discriminating means, wherein said management apparatus has an operation restriction table for assigning functional restrictions on operations of said organizer and said participants, and wherein items restricted by said operation restriction table are items including items of restrictions on connections to other networks.

* * * * *